June 28, 1927.
J. L. UHLIK
1,634,004
UNIVERSAL FRUIT TREE PROP LINE SUPPORT
Filed Jan. 16, 1923
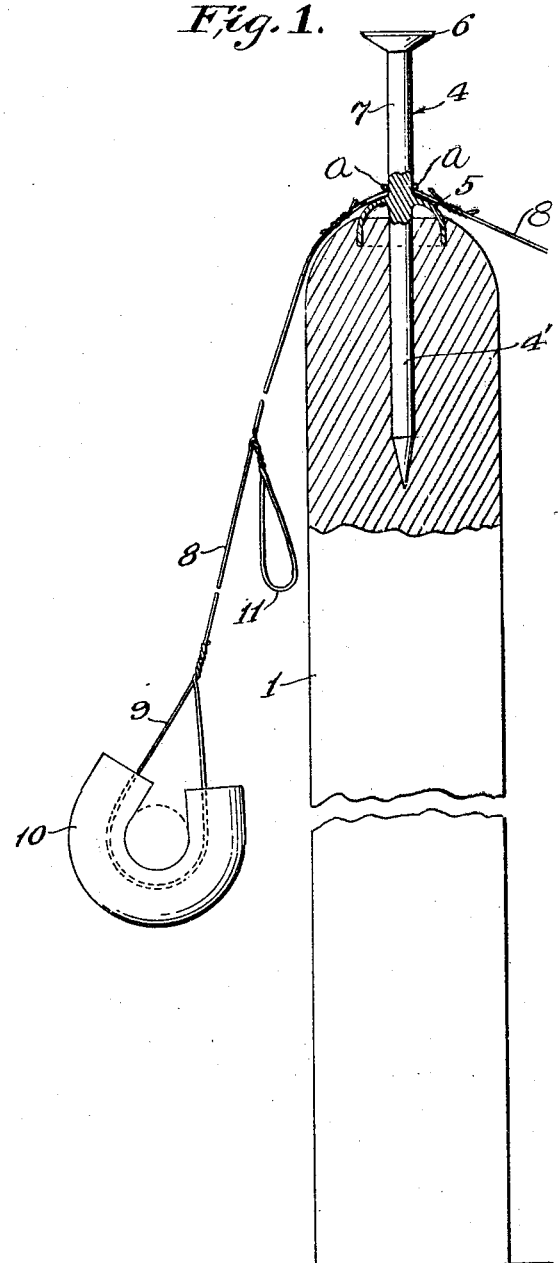

Patented June 28, 1927.

1,634,004

UNITED STATES PATENT OFFICE.

JOHN L. UHLIK, OF LOS ANGELES, CALIFORNIA.

UNIVERSAL FRUIT-TREE PROP-LINE SUPPORT.

Application filed January 16, 1923. Serial No. 612,942.

An object of this invention is to provide an effective and easily applied device for holding limb supporting lines to the top of a thin scantling.

Such limb supporting lines may be in the form of thin wires suspended from the top of the prop and adapted to be attached at their free ends to the limbs where support is required.

An object of this invention is to minimize the cost of equipping an orchard with props of this character and preserving such props from splitting.

Another object is to provide a cheap anti-split line holding device for fruit tree props which may be quickly and easily applied to a prop.

Other objects, advantages and features of invention may appear from the accompanying drawing, the subjoined detail description and the appended claim.

The accompanying drawing illustrates the invention.

Fig. 1 is a broken fragmental view partly in section showing the prop with one supporting line having one loop made thereon and attached to the line holding device. A fragment of another attached supporting wire is shown.

Fig. 2 is a bottom view of the spike used at the top of the standard.

The standard 1 is preferably constructed of a piece of thin timber of a length sufficient to reach from the ground to the top of the tree. Such timber may be 1 by 2 inches or 1 by 3 inches, more or less.

The lower end of the standard is secured to a base 2 that is adapted to rest on the ground and prevent said standard from sinking into the ground.

In this invention I provide a spike 4 which has a tang 4' for approximately one-half its length that is adapted to be driven into the end of the standard. A cup shaped flange 5 is formed approximately midway on said spike 4 and the mouth of which is open towards said tang, said flange is adapted to contact with or bear against the end of the standard 1 or if desired such flange may be driven into the end of said standard. The flange is adapted to hold the head 6 of the spike 4 a predetermined distance from said standard. The shank 7 formed between the flange 5 and head 6 is adapted to receive one end of each limb supporting flexible line 8.

The free end of the limb supporting line 8 is formed into a loop 9 about the limb to be supported. Other loops 11 may be formed at intervals intermediate the ends of the line 8 or wherever needed for the purpose of suspending therefrom auxiliary supporting lines.

In practical operation at the beginning of the fruit maturing season a standard of the above described character is placed near each tree which appears to be more heavily loaded with fruit than its limbs will support; the base 2 of said standard will rest on the ground rising in close proximity to the body or trunk of the tree and extending into or above the top branches. A line 8 will then be secured in the manner above set forth by its loop 9 to any limb which needs support. The line will be provided at the end with a loop $a$ brought over the top of the standard and caught over the spike 4; or the end of the line thus fastened may be of sufficient length after fastening to be brought down on the opposite side of the tree and attached by a loop 9 to another branch.

The lines 8 are not limited in number and may be placed as desired or as seems advisable for the proper support of the branches.

The auxiliary loops 11 formed in the lines 8 provide convenient means to which other lines may be attached when it is not expedient to use the central line supporting spike 4.

The top of the standard 1 is preferably rounded and the inverted cup shaped flange 5 driven into the end thereof, as shown in Fig. 1. The flange 5 thus serves as a ferrule for the end of the standard and the likelihood of the standard splitting is reduced to a minimum. The flange 5 also serves as a stop when driving the spike into the end of the prop.

I claim:

In a device of the character described, a spike having a head, said spike being adapted to be driven into a standard, an integral cup shaped flange arranged to penetrate the material of the standard to serve as a ferrule for the end of said standard; the head of said spike being spaced from said flange to form an elongated shank adapted to receive one end of a supporting line.

In testimony whereof, I have hereunto set my hand at Los Angeles, California, this 5th day of January, 1923.

JOHN L. UHLIK.